2,937,106
Patented May 17, 1960

2,937,106

DIALKYLPOLYAMINOPOLYALKALENE AMIDES AS ASPHALT ANTISTRIPPING AGENTS

Joseph Emmett Carpenter, Greenwich, and Edwin Ralph Kolodny, Stamford, Conn., assignors to American Cyanamid Company, New York, N.Y., a corporation of Maine No Drawing. Application September 11, 1957
Serial No. 683,226

6 Claims. (Cl. 106—273)

This invention relates to certain dialkylpolyaminopolyalkalene amides and their use in asphalt as antistripping agents, which have excellent stability at elevated temperatures, both in the asphalt composition alone and in the asphalt composition in contact with both alkaline and acid aggregate.

More specifically, the compounds are of the general formula:

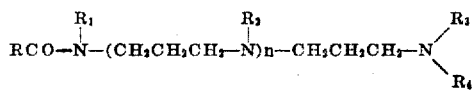

where the RCO is an acyl group derived from a carboxylic acid of from 12 to 20 carbon atoms which may be of the saturated or unsaturated fatty acid series, and particularly naturally occurring acids and their mixtures, $R_1$ and $R_2$ are hydrogen or 1 to 4 carbon alkyl radicals, $R_3$ and $R_4$ are alkyl radicals of from 1 to 4 carbon atoms, and $n$ is a small whole number, not less than 1 nor more than 4; and the fatty acid and rosin acid salts of these amides.

The problem of securing a satisfactory bond between bituminous compositions and the various surfaces to which they are applied in industrial operations, particularly stony aggregate in road building, is well recognized. Many patents have issued on various bonding agents, of which the most effective have generally been cationic surface active agents. Among the better of these are included aminoalkyl amides and polyaminoalkyl amides, sometimes used also as their carboxylic acid salts. Most of these products are effective in causing the adherence of the bituminous compositions to aggregates in certain instances, but possess serious shortcomings for general purpose use.

It has been well recognized that it is desirable that the bituminous composition containing the additive should be storage stable even at elevated temperatures of the nature of 350° F., and preferably even higher, inasmuch as asphalt is commonly stored hot for periods of a week or more prior to use. It is also desirable that the bituminous composition containing the additive should adhere to wet as well as to dry aggregate and to cold as well as to hot aggregate. It has also been recognized that there are various classes of aggregate, some of which are acidic in character, and some of which are basic in character, and that it would be desirable to provide a single all-purpose additive which would be effective with either of these or with mixtures of the two.

While there requirements have been reasonably well recognized, a solution to the requirements has been much more elusive. Many of the compounds which have been used are satisfactory cationic anti-stripping agents when used on siliceous aggregates, or when used without subjecting to heat. Many of them, when heated to the temperatures necessary for convenient use in asphaltic compositions, have been found to lose their cationic activity possibly by decomposition with the elimination of ammonia or amine, or possibly through the reaction of amine groups with acidic radicals in the asphaltic material. Certain additives sold as heat-stable additives are indeed found to be satisfactory after hot storage when applied to acidic or siliceous aggregates, but fail when applied to alkaline aggregates such as dolomite and limestone.

The novel bituminum additives of the present invention are essentially the reaction product of a dialkylpolyaminopolyalkylene amine, and a fatty acid having from 12 to 20 carbon atoms. Commercially, it is necessary that the additives for bituminous compositions have a very low price, and accordingly, it is found that the fatty acids from natural sources such as tall oil, fish oil, coconut oil, and the like, are particularly useful commercially. Where price permits, the more or less pure fatty acids such as oleic or linoleic acid are entirely effective and completely satisfactory. The fatty acids need not be used in pure form, and commercially it is found particularly advantageous to use crude tall oil, which, in addition to the fatty acids, also contains a certain amount of rosin acid. While not necessary, the rosin acid may be permitted to remain in the additive and form a salt with the amine groups, and in fact, it is also possible to use a sufficient excess of fatty acid so that at least part of the amine groups form salts with the fatty acid. Most bituminous compounds have a certain amount of acidic material already present therein, and the amine groups not neutralized by the fatty acid or rosin acid may be neutralized, at least in part, by the acids in the bituminous composition itself.

While the compounds of this invention contain at least two amino groups in addition to the nitrogen present in the amide group, more amino groups may be present.

The polyamine starting material is conveniently prepared by adding a dialkylaminoalkylamine to acrylonitrile and hydrogenating the product, for example, with Raney nickel catalyst, preferably in the presence of ammonia, which converts the nitrile groups to primary amine groups. The product thus obtained, starting with a dimethyl aminopropylamine would be a dimethylaminopropylaminopropylamine. Other dialkylamino starting materials may be used containing up to 4 carbon atoms in the alkyl groups. Mixtures may be used as well as compounds in which the alkyl groups are not necessarily the same. Dialkylaminopropylaminopropylamine may be reacted with additional acrylonitrile and the product again hydrogenated to add an additional propylamino moiety to the chain. The cost of this reaction is such that the dialkylaminopropylaminopropylamines will generally be preferred commercially over longer chain products containing more propylamino groups, but the longer chains are very useful where the cost structure is such as to permit their use.

The intermediates prepared as above contain secondary amino groups along the chain. Other useful products result when these secondary amine groups are alkylated by alkyl groups of 1 to 4 carbon atoms, and the alkylation may be performed either before or after the reaction of the intermediate polyamine with a fatty acid. One simple method is to add an aldehyde or ketone of not more than 4 carbon atoms to the adduct of acrylonitrile and dialkylaminopropylamine. The secondary amino group will be reductively alkylated simultaneously with the hydrogenation of the nitrile group. Reductive alkylation may also be applied to the polyamine after reaction with the fatty acid. Alternately, special methods of alkylation, specifically methylation, may be applied, as for example by the use of formaldehyde and formic acid as described in Example 11 below. The present novel materials are most conveniently added to or incorporated in the bituminous component before it is mixed with the aggregate, as, for example, they may be added to molten asphalt or to cut back asphalt. However, if desired the dialkylpolyaminopolyalkalene amides may be added to the mixer in which the bituminous material and the mineral aggregate are being mixed, and, in the case of asphalt emulsions, the dialkylpolyaminapolyalkene amides may be added to the emulsion after it has been produced, or to the bituminous component of such emulsions before emulsification. The invention is not limited to any particular mode of incorporating the present novel additive in the bituminous composition, so long as it is reasonably uniformly distributed throughout the fiinished composition, and particularly so that it is given a chance to be present at the interface between the aggregate and the bituminous material. The novel additive may, in fact, be sprayed upon the aggregate as an oil solution or emulsion and thus introduced into the interface between the aggregate and the bituminous material.

Whereas, the bituminous additives are primarily designed for use in the paving of roads using aggregates, which aggregates contain alkaline materials such as limestone, they are also useful in the coating concrete masonry and the like to render it impervious to water and in the filling of cracks in the highways and concrete structures, in roofing materials, and in the protection of exposed girders, ships' hulls, and other steel parts from corrosion.

The bituminous material itself used may be a residual asphalt, a pyrogenous asphalt, blown asphalt, or a natural asphalt, or asphaltite. The bituminous material may be used as such in which case it normally must be heated to become sufficiently fluid to be useful, or it may be cut back with any of the conventional solvents used to form cut back asphalts which may be applied at lower temperatures. Other applications for the present novel compositions will become apparent to those skilled in the art.

The amount of material to be used varies largely with the bituminous content of the final aggregate. Satisfactory results are obtained when used in a proportion of from approximately 0.1 to 5 parts by weight to 100 parts of bituminous material. Particularly effective results are obtained with from 0.5 to 2 parts by weight per 100 parts of bituminous material.

In addition to their use as asphalt additives, the present novel dialkylpolyaminopolyalkylene amides are useful as cationic surface active agents, and may be used as flotation reagents and additionally posses fungicidal activity.

The invention is further illustrated by the following examples in which parts are by weight, unless otherwise stated:

EXAMPLE 1

*Dimethylaminopropylaminopropylamine*

Dimethylaminopropylamine is reacted with an equal molecular proportion of acrylonitrile, using cooling to prevent the reaction from getting out of control, and the resultant product is hydrogenated at a temperature between 90 and 120° C. at a pressure of 2000 lbs. per square inch with Raney nickel catalyst in the presence of ammonia. After substantially the theoretical uptake of hydrogen has occurred, the hydrogenation product is stripped of a minor proportion of low-boiling components by vacuum distillation at 25 mm. Hg to a final pot temperature of 110° C.

The residual product is dimethylaminopropylaminopropylamine as a colorless liquid, with a sharp ammoniacal odor.

EXAMPLE 2

*Distilled tall oil and dimethylaminopropylaminopropylamine*

100 parts of distilled tall oil containing 0.25 equivalent of fatty acids per 100 grams, available as a commercial product is mixed with 40.8 parts of dimethylaminopropylaminopropylamine produced as in Example 1. The mixture is heated in a reactor with a fractionating column and distillation condenser attached. The temperature is held at 150–160° C. until most of the reaction occurs. The reaction is substantially complete after 1½ hours. The temperature is then raised to cause distillation of water formed in the reaction, and heating is discontinued at 180° C. The product is a reddish, somewhat viscous liquid obtained in a yield of 135 parts. It is ready for use as an asphalt additive without further treatment.

EXAMPLE 3

*Crude tall oil and dimethylaminopropylaminopropylamine*

The procedure of Example 2 is repeated using 40.8 parts dimethylaminopropylaminopropylamine and 156 parts of a crude tall oil containing 0.25 equivalent of fatty acids. The product is darker and less pure than obtained from using distilled tall oil as a starting material, and may be used as an asphalt additive without further refining.

EXAMPLE 4

*From fish oil*

The procedure of Example 2 is repeated, using an equivalent molecular proportion of a fish oil. The product is similar in appearance.

EXAMPLE 5

*From coconut oil*

The procedure of Example 2 is repeated, using an equivalent molecular proportion of coconut oil. The product is similar in appearance.

EXAMPLE 6

*From oleic acid*

10 mols of dimethylaminopropylaminopropylamine is mixed with 10 mols of oleic acid in a reaction vessel equipped with a fractionating column and condenser. The mixture is heated until the theoretical amount of water is distilled over. The resulting product is dimethylaminopropylaminopropyl oleamide.

EXAMPLE 7

*From linoleic acid*

The procedure of Example 2 is repeated, using 50 mols of linoleic acid and 50 mols of dimethylaminopropylaminopropylamine. The mixture is heated in a reactor equipped with a fractionating column and a distillation condenser, and the water which is eliminated is collected. After substantially all of the theoretical amount of water has been collected the mixture is allowed to cool and the thus produced dimethylaminopropylaminopropylamine linoleamide is then ready for use as an asphalt additive.

EXAMPLE 8

*Dimethylaminopropylaminopropylaminopropylamine*

The product of Example 1 is reacted with an equal molecular proportion of acrylonitrile, cooling to prevent the reaction from getting out of control, and the resultant is then hydrogenated at between 90 and 120° C. and 2000 lbs. per square inch with Raney nickel catalyst in the presence of ammonia until substantially the theoretical uptake of hydrogen has taken place. The hydrogenation product is stripped of low boilers by vacuum distillation. The product obtained is dimethylaminopropylaminopropylaminopropylamine.

EXAMPLE 9

*Tall oil and dimethylaminopropylamino propylaminopropylamine*

The product of Example 8 is reacted with distilled tall oil following the procedure of Example 2, correcting for the higher molecular weight of the amine. A substantially similar appearing product is obtained which is equally satisfactory as an asphalt additive.

EXAMPLE 10

*Oleic acid and dimethylaminopropylamino propylaminopropylamine*

The procedure of Example 6 is repeated, using the dimethylaminopropylaminopropylaminopropylamine of Example 8. An excellent asphalt additive is obtained.

EXAMPLE 11

*Methylation of dimethylaminopropylamino-propyl oleamide*

423 parts of the product from Example 6 is heated under reflux for 4 hours with 100 parts 37% formalin, 51 parts 88% formic acid and 400 parts ethanol, at which time carbon dioxide evolution is complete. The ethanol is distilled off, the residue washed once with concentrated sodium hydroxide solution, and allowed to stand overnight over solid sodium hydroxide. The decanted viscous liquid is

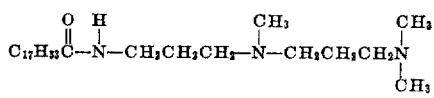

EXAMPLE 12

*Diethylaminopropylaminopropylamine*

Diethylaminopropylamine is reacted with an equal molecular proportion of acrylonitrile following the procedure set forth in Example 1. There is obtained diethylaminopropylaminopropylamine.

EXAMPLE 13

*Diethylaminopropylaminopropyl oleamide*

The product of Example 12 is reacted with a molecular proportion of oleic acid using the procedure of Example 6. There is obtained diethylaminopropylaminopropyl oleamide which is an excellent asphalt additive.

EXAMPLE 14

*Stripping test*

The strip resistance was measured by the following test procedure:

25 grams of aggregate are placed in a 4 ounce wide mouth, screw cap glass jar. 50 grams of water is added. 1.5 grams of the asphalt-additive mixture is weighed into the jar, the cover replaced and the jar rotated end-over-end for 15 minutes at 35 revolutions per minute. At the end of the cycle, the water is decanted and the percent aggregate area coated by the asphalt is estimated by visual inspection.

The above test procedure was used to evaluate three asphalt additives with the results shown as follows:

TABLE 1.—PERCENT AREA COATED IN WET AGGREGATE COATING TESTS

|  | Unheated Asphalt | | | After heating asphalt with additive for 24 hours at 350° F. | | |
| --- | --- | --- | --- | --- | --- | --- |
|  | Lime-stone | Trap-rock | Gran-ite | Lime-stone | Trap-rock | Gran-ite |
| Additive A | 100 | 100 | 100 | 90–100 | 100 | 100 |
| Additive B | 80–90 | 100 | 100 | <10 | 100 | 100 |
| Additive C | 60–70 | 100 | 100 | <10 | 100 | 100 |

The chemical formulas of the additives are as follows:

Additive A:

Additive B:

Additive C:

R–CO is the acyl group from tall oil fatty acids.

Additive A is a product of this invention, being the material made in Example 2. Additives B and C are shown for comparison, being examples of the better cationic surface active additives previously known. Additive B was made by reacting dimethylaminopropylamine with the same distilled tall oil used in Example 2 and under substantially the same reaction conditions. It contains only one basic nitrogen atom in its molecule. It is representative of a class of asphalt additives described by Jelling, U.S. Patent 2,663,648, "Thermally Stable Bituminous Bonding Compositions," December 22, 1953. Additive C is a commercial sample, understood also to have been made from tall oil. Both Additives B and C are claimed to be heat stable. Table 1 shows that this claim apparently is valid insofar as the use of these additives on siliceous aggregates is concerned. They fail badly after hot storage, however, in producing adhesion between asphalt and limestone aggregate.

On the other hand, Additive A shows nearly complete retention of its effectiveness after hot storage even when applied to limestone aggregate. Because of the lack of great dissimilarity between its chemical structure and those of the additives of the prior art, this result is unexpected and novel. It is not difficult, however, to account for the superiority of the additives of this invention. Evidently it is necessary, first, that a successful additive contain at least two basic nitrogen atoms for each long hydrocarbon chain in the molecule. This requirement distinguishes the products of this invention from those of Jelling. Second, it is not sufficient that at least two basic nitrogen atoms be present, since the usual polyethylene polyamine condensates such as Additive C meet this requirement; but it is further necessary that these be protected by alkylation to prevent reaction with acidic compounds in the asphalt to form amides during hot storage. It is not necessary that all of the basic nitrogen atoms in the molecule be alkylated, but a sufficient degree of protection is provided if the terminal basic nitrogen atom is so alkylated.

The products of Examples 3, 4, 5, 6, 7, 9, 10, 11, and 13 may be tested by the same procedure and are found to have superior results, particularly in the presence of aggregates containing limestone.

The importance of the asphalt additive that will give uniform cohesion, even in the presence of less desirable aggregates, is extremely important when it is considered that, in many instances, for bituminous plants, it is necessary to use aggregates which are locally available, and if the class of aggregates is unduly restricted because the asphalt will not stick, it then becomes necessary to use a higher cost aggregate.

Having described certain embodiments thereof as our invention, we claim:

1. A bituminous composition containing a strip inhibiting additive which is thermally stable at 350° F., in the presence of both acidic and alkaline aggregate which additive consists essentially of a dialkylaminopolyamine of the formula:

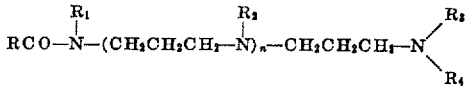

where RCO— is the acyl group of a carboxylic acid selected from the group consisting of $C_{12}$ to $C_{20}$ saturated and unsaturated fatty acids, and mixtures thereof, $R_1$ and $R_2$ are radicals selected from the group consisting of hydrogen and 1 to 4 carbon alkyl radicals, $R_3$ and $R_4$ are 1 to 4 carbon alkyl radicals, and $n$ is a small whole number not less than 1 and not more than 4; and its $C_{12}$ to $C_{20}$ saturated and unsaturated fatty acid and rosin acid salts.

2. A bituminous composition containing a strip inhibiting additive which is thermally stable at 350° F., in the presence of both acidic and alkaline aggregate which additive consists essentially of a dimethylaminopropylaminopropyl amide of a 12 to 20 carbon atom fatty acid of the formula:

RCO—NH—CH$_2$CH$_2$CH$_2$—NH—CH$_2$CH$_2$CH$_2$—N—(CH$_3$)$_2$ where RCO— is the acyl group of a carboxylic acid selected from the group consisting of C$_{12}$ to C$_{20}$ saturated and unsaturated fatty acids, and mixtures thereof; and its C$_{12}$ to C$_{20}$ saturated and unsaturated fatty acid and rosin acid salts.

3. A bituminous composition containing a strip inhibiting additive which is thermally stable at 350° F., in the presence of both acid and alkaline aggregate which additive consists essentially of the compound of the formula:

RCO—NH—CH$_2$CH$_2$CH$_2$—NH—CH$_2$CH$_2$CH$_2$—N—(CH$_3$)$_2$ where RCO— is the acyl group of tall oil fatty acids.

4. An asphaltic paving composition containing both acidic and alkaline aggregate and a bituminous composition containing a strip inhibiting additive which is thermally stable at 350° F., in the presence of both acidic and alkaline aggregate which additive consists essentially of a dialkylaminopolyamine of the formula:

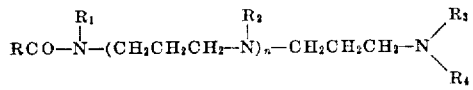

where RCO— is the acyl group of a carboxylic acid selected from the group consisting of C$_{12}$ to C$_{20}$ saturated and unsaturated fatty acids, and mixtures thereof, R$_1$ and R$_2$ are radicals selected from the group consisting of hydrogen and 1 to 4 carbon alkyl radicals, R$_3$ and R$_4$ are 1 to 4 carbon alkyl radicals, and $n$ is a small whole number not less than 1 and not more than 4; and its C$_{12}$ to C$_{20}$ saturated and unsaturated fatty acid and rosin acid salts.

5. An asphaltic paving composition containing both acidic and alkaline aggregate and a bituminous composition containing a strip inhibiting additive which is thermally stable at 350° F., in the presence of both acidic and alkaline aggregate which additive consists essentially of a dimethylaminopropylaminopropyl amide of a 12 to 20 carbon atom fatty acid of the formula:

RCO—NH—CH$_2$CH$_2$CH$_2$—NH—CH$_2$CH$_2$CH$_2$—N—(CH$_3$)$_2$ where RCO— is the acyl group of a carboxylic acid selected from the group consisting of C$_{12}$ to C$_{20}$ saturated and unsaturated fatty acids, and mixtures thereof; and its C$_{12}$ to C$_{20}$ saturated and unsaturated fatty acid and rosin acid salts.

6. An asphaltic paving composition containing both acidic and alkaline aggregate and a bituminous composition containing a strip inhibiting additive which is thermally stable at 350° F., in the presence of both acid and alkaline aggregate which additive consists essentially of the compound of the formula:

RCO—NH—CH$_2$CH$_2$CH$_2$—NH—CH$_2$CH$_2$CH$_2$—N—(CH$_3$)$_2$ where RCO— is the acyl group of tall oil fatty acids.

References Cited in the file of this patent

UNITED STATES PATENTS

| | | |
|---|---|---|
| 2,426,220 | Johnson | Aug. 26, 1947 |
| 2,514,954 | Johnson et al. | July 11, 1950 |
| 2,737,509 | Jelling | Mar. 6, 1956 |

FOREIGN PATENTS

| | | |
|---|---|---|
| 578,694 | Great Britain | July 9, 1946 |
| 917,518 | France | Jan. 9, 1947 |